Dec. 25, 1934. R. MICHEL Re. 19,406

ROLLING MILL

Original Filed May 9, 1929 2 Sheets-Sheet 1

INVENTOR
R. Michel,
BY Langner, Parry, Card & Langner
ATTYS.

Dec. 25, 1934. R. MICHEL Re. 19,406

ROLLING MILL

Original Filed May 9, 1929 2 Sheets-Sheet 2

INVENTOR
R. Michel,
BY Langner, Parry, Card & Langner
ATTYS.

Reissued Dec. 25, 1934 Re. 19,406

UNITED STATES PATENT OFFICE 19,406

ROLLING MILL

René Michel, Argenteuil, Seine-et-Oise, France, assignor, by mesne assignments, to American Rolling Mill Company, Middletown, Ohio, a corporation of Ohio Original No. 1,865,941, dated July 5, 1932, Serial No. 361,783, May 9, 1929. Application for reissue October 16, 1933, Serial No. 693,848. In Germany May 19, 1928

7 Claims. (Cl. 80—35)

The present invention relates to a method for the rolling, or analogous treatment, of strips, wire or the like having a great length, by passing the bands through several successive trains of rolls.

In the rolling mills thus disposed, the length of the strip comprised between two trains of rolls will vary even if the said trains operate at exactly constant speeds.

According to the present invention, the loose part or loop between the two trains of rolls is stretched by the action of a constant force, and this process assures the proper operation of the rolling mill and a constant thickness of the rolled strip.

To carry the said process into effect, it is possible to employ between the two trains of rolls, a roller which bears upon the strip by the action of a suitably applied force which may be produced by a weight subject to gravity and having an adjustable position upon a lever which is connected to the said roller by rod-and-link gear.

The movements of said roller preferably control the speed of the two trains of rolls, or of only one, thus reducing the length of the loose part or loop when the said roller descends, or inversely. It is also feasible to control by the displacements of the said roller the parts by which the rolls are variably spaced apart, so as to compensate the elongation and the shortening of the said loop.

To prevent the said roller from falling when at the end of the strip, the apparatus may comprise a supporting roller carrying the strip, which presses upon this roller, and a mechanism so arranged that when this pressure ceases the roller will be held in the position which it occupies.

The device may comprise a drum carrying a cable which is attached to the said roller. A counterweight serves to stretch the cable, and a brake is mounted on the roller, so that when the strip reaches the end it will no longer press upon the said supporting roller, and thus a suitable mechanism will actuate the brake, to prevent the said roller from falling.

In the accompanying drawings which are given by way of example to facilitate the description:

Figure 2:
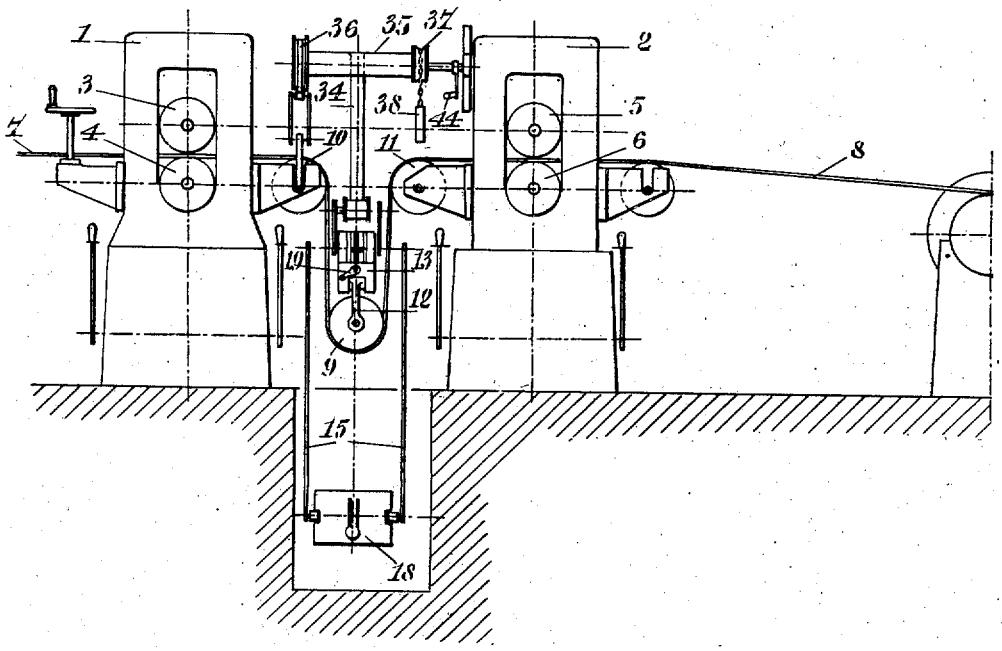
Figure 2 is a corresponding end view, showing the trains of rolls.

The form of construction herein represented relates to the case of two trains of rolls 1, 2 mounted in series, each train having two rolls 3, 4 and 5, 6 respectively. The strip to be rolled is fed in at 7 (Figure 2) it travels between the rolls 3, 4 and then between the rolls 5, 6, and issues at 8. Between the trains 1 and 2 is disposed a roller 9 upon which the strip travels, and the strip is also supported by the rollers 10, 11. The roller 9 is mounted in a forked bracket secured to the end of a lever 13, pivoted at 14, and the said bracket is so disposed that the roller 9 will always remain horizontal. This roller is slidable on its axle but is not movable in the direction of travel of the strip.

The said lever 13 is connected by rods 15 to an arm 16 (Fig. 2) rotatable on a fixed axle situated at 17. The counterweight 18 mounted on said arm 16 tends to draw down the roller 9 by means of the rods 15, and said weight is slidable on the arm 16 by the action of a handle 19 and the chains 20, 21, 22. The pointer 23 shows this motion, and it thus indicates the effort exercised upon the roller 9.

Figure 1:
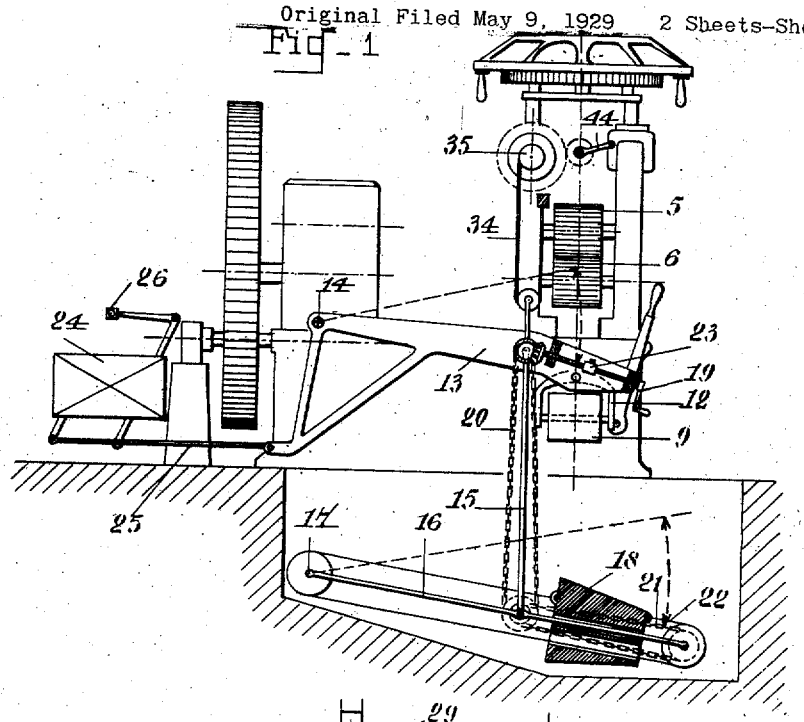
Figure 1 is a diagrammatic view of an apparatus according to the invention.
Figure 3:
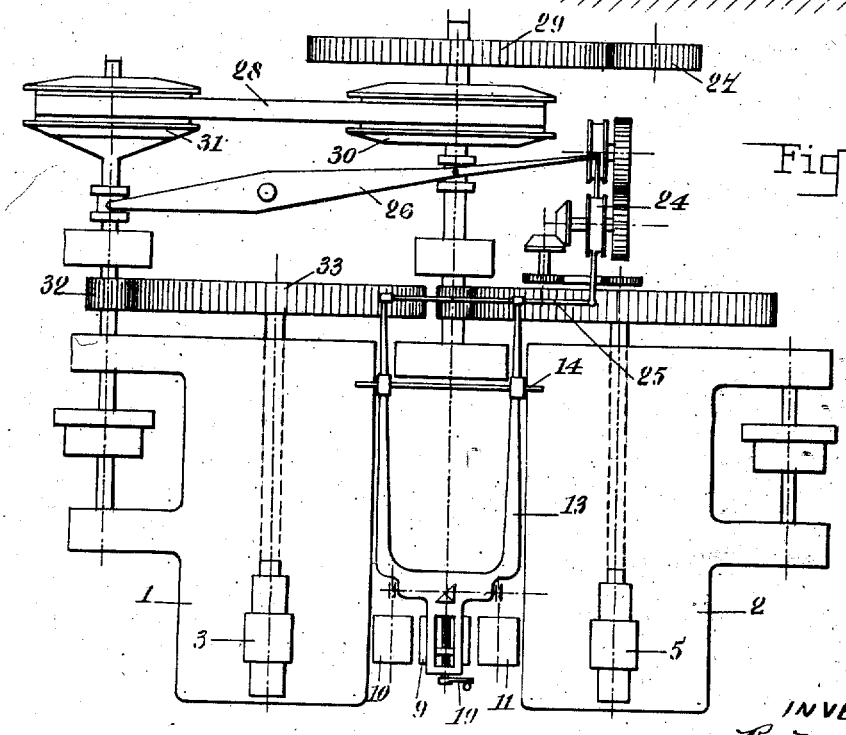
Figure 3 is the corresponding plan view.

The said roller 9 controls a servo-motor 24 by means of a lever 13 and rod 25, and said motor actuates a pivoted arm 26 which changes the ratio of the driving gear and hence the speed of the train of rolls 1, that is, the train into which the said strip 7 enters; in fact, the power is transmitted from the driving pinion 27 (Figure 3) to the roll of the first train by means of the gear wheel 29, the pair of pulleys (connected by a belt 28) and the gear wheels 32, 33. Said pulleys are constructed, for example, as shown in my British Patent No. 315,797, so that their driving ratio can be varied by the action of said arm 26.

It is thus observed that due to the adjustment of the position of the weight 18 by the handle 19, the strip is pressed down at the proper tension which is required for an approved rolling of the strip whereby a uniform thickness will be obtained. When the roller 9 descends, it actuates—by the servo-motor—the apparatus which reduces the speed of the train 1. The loose part or loop of the band 7 is thus shortened, and the roller 9 resumes its position. The operation is performed in the inverse direction when the roller 9 rises, and the speed of the train 1 is thus increased.

In this manner, all disturbances are automatically compensated, and the operator is only required to look after the output train of rolls in order to assure the regularity of the strip. If as occurs in practice he should be obliged to modify the pressure between the output rolls, these modifications are automatically performed at the input rolls.

Obviously, more than two trains of rolls can be mounted in series, with a stretching roller disposed between each train.

In the case of three trains in series, the middle train of rolls is preferably operated at constant speed, and the speed of the other two is regulated by the adjacent regulating rollers.

It is preferable that the same adjustment be preserved for all the strips of the same lot, or else when a strip has travelled through, the roller 9 will tend to descend. This defect is obviated in the following manner.

The lever 13 is suspended from the belt 34 which is wound upon the drum 35. To the said drum is secured at one end a brake drum 36 (Figures 2 to 4) and at the other end a pulley 37 controlled by the counterweight 38.

Figure 4:
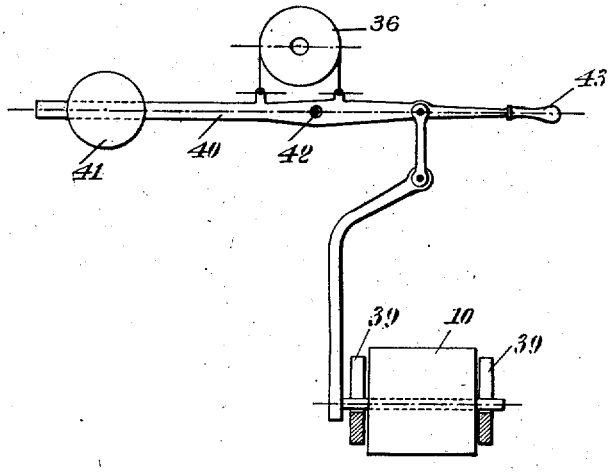
Figure 4 is a partial view showing the brake for the cable drum and its control.

When issuing from the rolls 1, the rolled strip 7 travels over a supporting roller 10 whose axle is movable in slots 39 (Fig. 4). The said roller is suspended from the lever 40 of the band brake 36. During the rolling process, the pressure of the strip 7 on the roller 10 will bring it upon its supports of rotation, and the brake 36 is out of action, so that the drum 35 will follow all motion of the lever 13 due to the action of the said weight 38, whereby the belt 34 will be constantly stretched.

When the rear end of the strip 7 leaves the train 1, the pressure ceases upon the roller 10, so that the weight 41 will raise it while turning the lever 40 on its axle 42, thus applying the brake 36, and thus the lever 13 and roller 9 are at once held fast at a level hardly below their operating position.

To take in the next strip, the operator seizes it when issuing from the train of rolls 1; he then passes it under the roller 9 and inserts it into the rolls 2. Since the roller 9 is somewhat lowered, the strip tends to lower the roller 10, and it thus releases the drum 35 and also the lever 13.

If for any reason the strip is not properly stretched, the operator presses upon the handle 43 at the end of the brake lever 42, thus lowering the roller 9 gradually into contact with the strip. When the adjustment is to be changed, he operates the drum 35 by the crank 44, also relieving the brake 36 by means of the said handle 43.

Having now particularly described and ascertained the nature of my invention and in what manner the same is to be performed, I declare that what I claim is:

1. A rolling mill comprising two trains of rollers, a roller between said two trains of rollers adapted to rest upon the material treated, a lever connected by linkage to said roller, a counterweight movably mounted upon said lever and means for displacing said counter-weight.

2. A rolling mill according to claim 1 comprising said roller resting upon said treated strip, an auxiliary roller upon which the treated material presses and means for maintaining said roller in place, said means being controlled by said auxiliary roller.

3. A rolling mill according to claim 1 comprising said roller adapted to rest upon the material treated between the sets of rolls, an auxiliary roller placed under the material treated, a device holding said first named roller, a brake in the said device and means controlled by said auxiliary roller to control the brake.

4. A rolling mill according to claim 1 comprising said roller adapted to rest upon the material treated between the sets of rolls, an auxiliary roller placed under the material treated, a drum carrying a cable connected to said first mentioned roller, a brake on the said drum, and means controlled by said auxiliary roller to control the brake.

5. A rolling mill according to claim 1 comprising said roller adapted to rest upon the material treated between the sets of rolls, an auxiliary roller placed under the material treated, a drum carrying a cable connected to said first mentioned roller, a brake on the said drum, a weight tending to turn the drum, and means controlled by said auxiliary roller to control the brake.

6. A rolling mill for tension rolling of metal strips comprising at least two stands of rolls for successively engaging and reducing the thickness of a metal strip, spaced rollers located between the stands over which the strip passes, a roller of substantially the diameter of the space between said rollers located to move toward and away from the space between said spaced rollers so as to engage and form a loop in the metal strip, regulatable means for applying a substantially constant force to said movable roller, and means for controlling the speed of at least one of the stands of rolls by variation in position of the movable roll so as to maintain the loop at all times, whereby an effective tension is applied to the piece between the stands which is of a substantially constant value.

7. In combination with the instrumentalities of a stand of rolls for cold rolling metal strip and spaced therefrom another device which feeds the strip, spaced rolls located between the stands over which the strip passes, a roller of substantially the diameter of the space between said spaced rolls located to move toward and away from the space between said spaced rolls so as to engage and form a loop in the metal strip, regulatable means for applying a substantially constant force to said movable roller, driving means for each of said instrumentalities and means for controlling the speed of at least one of the driving means by variation in position of the movable roll so as to maintain the loop at all times whereby an effected tension is applied to the piece which is of a substantially constant value.

RENÉ MICHEL.